United States Patent
Yu (10) Patent No.: US 9,588,915 B2
(45) Date of Patent: Mar. 7, 2017

(54) SYSTEM ON CHIP, METHOD OF OPERATING THE SAME, AND APPARATUS INCLUDING THE SAME

(71) Applicant: SAMSUNG ELECTRONICS CO., LTD., Suwon-si, Gyeonggi-do (KR)

(72) Inventor: Ki Soo Yu, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 584 days.

(21) Appl. No.: 14/073,235

(22) Filed: Nov. 6, 2013

(65) Prior Publication Data

US 2014/0173150 A1    Jun. 19, 2014

(30) Foreign Application Priority Data

Dec. 18, 2012 (KR) ........................ 10-2012-0148273

(51) Int. Cl.
- *G06F 13/24* (2006.01)
- *G06F 9/48* (2006.01)
- *G06F 1/32* (2006.01)

(52) U.S. Cl.
CPC ............ *G06F 13/24* (2013.01); *G06F 1/3203* (2013.01); *G06F 9/4893* (2013.01); *Y02B 60/1217* (2013.01); *Y02B 60/144* (2013.01)

(58) Field of Classification Search
CPC ...... G06F 13/24; G06F 1/3203; G06F 9/4893; Y02B 60/1217; Y02B 60/144
See application file for complete search history.

(56) References Cited

U.S. PATENT DOCUMENTS

| | | | |
|---|---|---|---|
| 7,343,463 B2 * | 3/2008 | Kakihara | G06F 3/061 711/112 |
| 7,661,002 B2 | 2/2010 | Pecone et al. | |
| 7,788,511 B2 | 8/2010 | Gary | |
| 7,840,825 B2 | 11/2010 | Altevogt et al. | |
| 7,971,073 B2 | 6/2011 | Hsu et al. | |
| 8,001,402 B2 | 8/2011 | Kashyap et al. | |
| 8,145,918 B2 | 3/2012 | Borghetti et al. | |
| 8,250,395 B2 | 8/2012 | Carter et al. | |
| 8,423,799 B2 * | 4/2013 | Krishnamurthy | G06F 1/3203 713/300 |

(Continued)

FOREIGN PATENT DOCUMENTS

| | | |
|---|---|---|
| JP | 2005-182223 | 7/2005 |
| JP | 2006-127302 | 5/2006 |

(Continued)

*Primary Examiner* — M Elamin
(74) *Attorney, Agent, or Firm* — F. Chau & Associates, LLC (57) ABSTRACT

A method of operating a system on chip (SoC) includes calculating a first residence time indicating an amount of time that at least one task resides in an execution queue in the SoC, wherein the at least one task is assigned to at least one core of a multi-core processor in the SoC, calculating a total unit residence time indicating an amount of time that all tasks other than the at least one task reside in the execution queue, calculating a second residence time for the at least one core by adding the first residence time of the at least one task and the total unit residence time, and adjusting at least one of an operating frequency and a voltage of the at least one core based on the second residence time.

20 Claims, 10 Drawing Sheets

(56) References Cited

U.S. PATENT DOCUMENTS

| | | | |
|---|---|---|---|
| 8,566,618 B2 | 10/2013 | Floyd et al. | |
| 8,839,200 B1 * | 9/2014 | Roskind | G06F 11/3644 |
| | | | 717/127 |
| 8,943,479 B1 * | 1/2015 | Roskind | G06F 11/3644 |
| | | | 717/127 |
| 2009/0049314 A1 | 2/2009 | Taha et al. | |
| 2009/0265572 A1 * | 10/2009 | Heinle | G06F 1/26 |
| | | | 713/500 |
| 2009/0328046 A1 * | 12/2009 | Proctor | G06F 9/4881 |
| | | | 718/102 |
| 2011/0271285 A1 * | 11/2011 | Devadoss | G06F 9/526 |
| | | | 718/104 |

FOREIGN PATENT DOCUMENTS

| | | |
|---|---|---|
| JP | 2010-079622 | 4/2010 |
| JP | 2010-186255 | 8/2010 |
| KR | 1020060113178 | 11/2006 |
| KR | 1020110050010 | 5/2011 |
| KR | 1020120040819 | 4/2012 |
| KR | 1020120061583 | 6/2012 |

\* cited by examiner

| Task | Size | Importance | Task Load |
|---|---|---|---|
| 1t | 1024 | x 200 | → 204800 |
| 2t | 2048 | x 100 | → 204800 |

SYSTEM ON CHIP, METHOD OF OPERATING THE SAME, AND APPARATUS INCLUDING THE SAME

CROSS-REFERENCE TO RELATED APPLICATIONS

This application claims priority under 35 U.S.C. §119 to Korean Patent Application No. 10-2012-0148273 filed on Dec. 18, 2012, the disclosure of which is hereby incorporated by reference in its entirety.

TECHNICAL FIELD

Exemplary embodiments of the present inventive concept relate to dynamic voltage and frequency scaling (DVFS), and more particularly, to a system on chip (SoC) for performing DVFS using task information of a scheduler, a method of operating the same, and an apparatus including the same.

DISCUSSION OF THE RELATED ART

In order to increase the use time of a mobile device having a limited battery capacity, DVFS may be used to restrict an operating frequency and voltage of a central processing unit (CPU) according to the amount of work done by the CPU (e.g., according to a CPU load while the CPU is operating).

Conventional DVFS-control techniques may adjust the operating frequency of a CPU using a result obtained by directly observing a recent CPU load, or using information obtained by analyzing the observation result.

When the operating frequency of the CPU is adjusted according to the recent CPU load, the reaction of the adjustment may be slow in circumstances where performance of the CPU is currently needed.

When the operating frequency of the CPU is adjusted based on a CPU load at the moment the CPU executes a task, the operating frequency may not be determined appropriately relative to the load of the present task, and may instead be determined based on the load of the task done in the past, since it cannot be known in advance what the present task is or what the load of the present task is.

Moreover, when the load of a current task in execution abruptly increases, the conventional DVFS techniques may not manage the task quickly.

SUMMARY

According to an exemplary embodiment of the present inventive concept, a method of operating a system on chip (SoC) includes calculating a first residence time indicating a time while at least one task resides in an execution queue, calculating a second residence time for at least one core by adding up the first residence time of the at least one task assigned to the at least one core, and adjusting operating frequency and voltage for the at least one core based on the second residence time.

Calculating the first residence time may include measuring an entry time at which the task enters the execution queue and an exit time at which the task exits from the execution queue, and calculating the first residence time based on a difference between the entry time and the exit time.

The method may further include calculating a unit residence time for each of at least one other task, calculating the second residence time by adding the sum of the unit residence time and the first residence time, and adjusting an operating frequency of a central processing unit (CPU) when the second residence time is equal to or greater than a reference time.

Calculating the first residence time may include calculating the first residence time corresponding to an execution state when the task is in the execution state in the execution queue.

Calculating the first residence time may include calculating the first residence time corresponding to a wait state when the task is in the wait state in the execution queue.

The method may further include setting a monitoring time in a register. Calculating the first residence time may include calculating the first residence time during the monitoring time.

Setting the monitoring time may include adjusting the monitoring time according to a variation of the first residence time, which is calculated based on the monitoring time. Adjusting the operating frequency and voltage may include generating an interrupt when a variation of the second residence time is equal to or greater than a reference value, and adjusting the operating frequency.

According to an exemplary embodiment of the present inventive concept, an SoC includes a processor including at least one core configured to execute at least one task, and a memory configured to provide the processor with the at least one task.

The processor may calculate a first residence time indicating a time while the at least one task resides in at least one execution queue, calculate a second residence time for the at least one core by adding up the first residence time of the at least one task assigned to the at least one core, and adjust at least one of an operating frequency and an operating voltage of the processor based on the second residence time.

The processor may include a plurality of CPU cores and the processor may calculate the first residence time for each of the CPU cores.

The processor may further include a register configured to set a monitoring time. The processor may calculate the first residence time during the monitoring time, calculate a variation of the first residence time based on the monitoring time, and adjust the monitoring time according to the variation of the first residence time.

The processor may generate an interrupt when a variation of the second residence time is equal to or greater than a reference value, and may adjust the operating frequency of the processor in response to the interrupt.

According to an exemplary embodiment of the present inventive concept, a mobile communication device includes the above-described SoC and an external memory configured to provide the SoC with the task.

The SoC may further include a timer. The processor may measure an entry time at which the task enters the execution queue and an exit time at which the task exits the execution queue using the timer, and may calculate the first residence time based on a difference between the entry time and the exit time.

The mobile communication device may be one of a mobile telephone, a smart phone, a tablet personal computer (PC), a personal digital assistant (PDA), an enterprise digital assistant (EDA), a digital still camera, a digital video camera, a portable multimedia player (PMP), portable navigation device (PND), a handheld game console, or an e-book.

According to an exemplary embodiment of the present inventive concept, a method of operating an SoC includes calculating a first residence time indicating an amount of time that at least one task resides in an execution queue in the SoC, wherein the at least one task is assigned to at least one core of a multi-core processor in the SoC, calculating a unit residence time indicating an amount of time that all tasks other than the at least one task reside in the execution queue, calculating a second residence time for the at least one core by adding the first residence time of the at least one task and the unit residence time, and adjusting at least one of an operating frequency and a voltage of the at least one core based on the second residence time.

According to an exemplary embodiment of the present inventive concept, a method of operating an SoC includes detecting an entry of a task to an execution queue and an exit of the task from the execution queue, calculating a first residence time based on a result of the detection, executing the task stored in the execution queue, and adjusting an operating frequency of a CPU when the first residence time is equal to or greater than a reference time.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Exemplary embodiments of the present inventive concept will be described more fully hereinafter with reference to the accompanying drawings. Like reference numerals may refer to like elements throughout the accompanying drawings.

It will be understood that when an element is referred to as being "connected" or "coupled" to another element, it can be directly connected or coupled to the other element or intervening elements may be present.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

Figure 1:
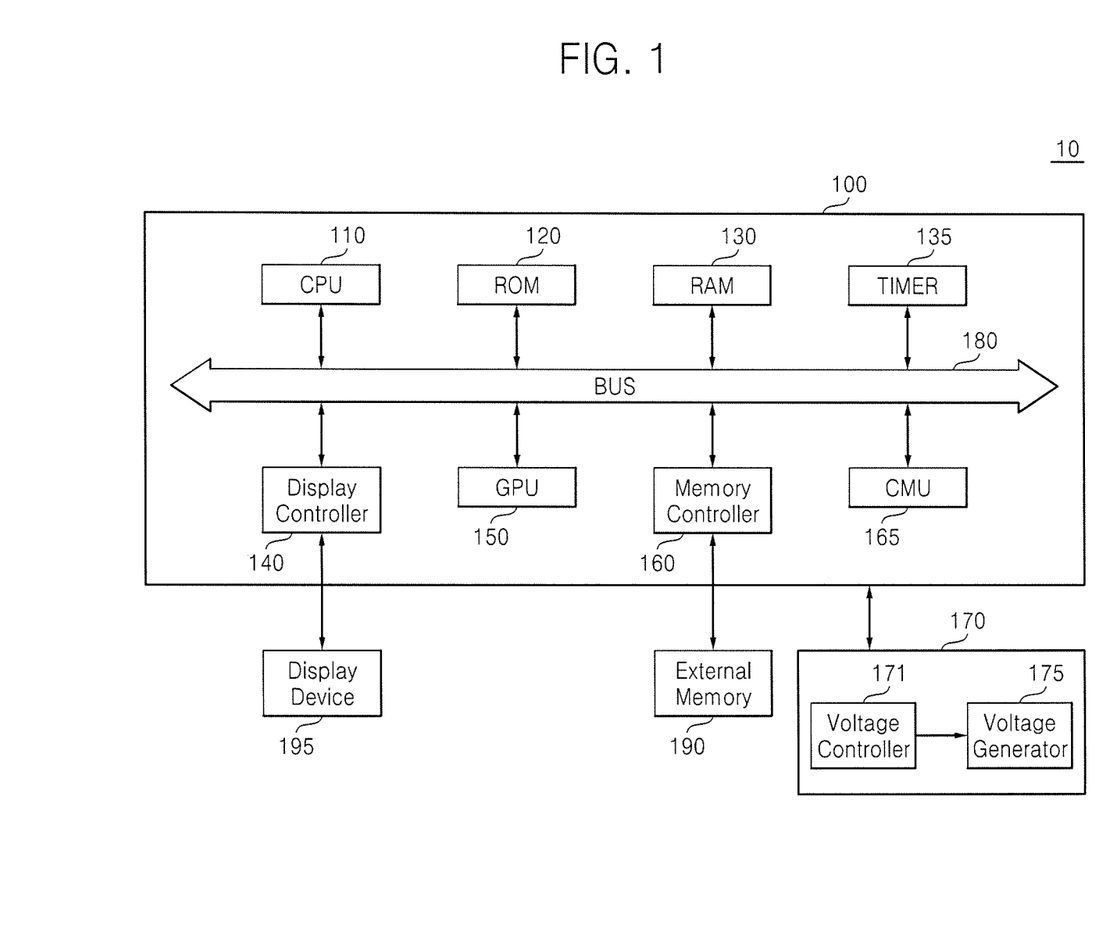
FIG. 1 is a block diagram of an electronic system, according to an exemplary embodiment of the present inventive concept.
Figure 2:
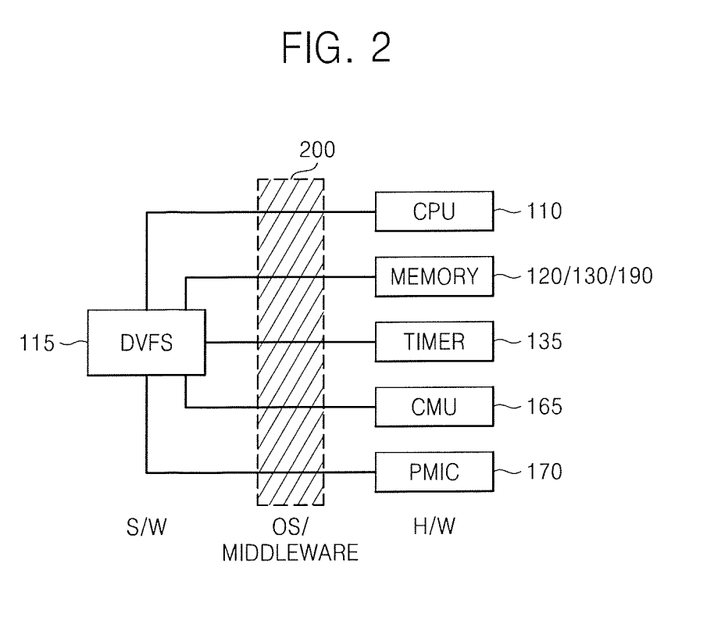
FIG. 2 is a block diagram illustrating the relationship between dynamic voltage and frequency scaling (DVFS) and other elements, according to an exemplary embodiment of the present inventive concept.

FIG. 1 is a block diagram of an electronic system 10, according to an exemplary embodiment of the present inventive concept. FIG. 2 is a block diagram illustrating the relationship between dynamic voltage and frequency scaling (DVFS) 115 and other elements, according to an exemplary embodiment of the present inventive concept.

Referring to FIG. 1, the electronic system 10 may be implemented as a handheld device such as, for example, a mobile telephone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), or an e-book. However, the electronic system 10 is not limited thereto.

The electronic system 10 may also be implemented as a processor for a server, a notebook computer, or a PC. The electronic system 10 may include a system on chip (SoC) 100, an external memory 190, and a display device 195.

The SoC 100 may include a central processing unit (CPU) 110, a read-only memory (ROM) 120, a random access memory (RAM) 130, a timer 135, a display controller 140, a graphics processing unit (GPU) 150, a clock management unit (CMU) 165, a memory controller 160, and a bus 180. However, the SoC 100 is not limited thereto, and may also include other elements. The electronic system 10 may also include a power management integrated circuit (PMIC) 170.

Although FIG. 1 shows an exemplary embodiment in which the PMIC 170 is implemented outside the SoC 100, exemplary embodiments are not limited thereto. For example, in exemplary embodiments, the SoC 100 may include a power management unit (PMU) within the SoC 100 that can perform the function of the PMIC 170. The PMIC 170 may include a voltage controller 171 and a voltage generator 175.

The CPU 110, which may also be referred to herein as a processor, processes/executes programs and/or data stored in the external memory 190. For example, the CPU 110 may process/execute the programs and/or the data in response to an operating clock signal output from the CMU 165.

The CPU 110 may be a multi-core processor. The multi-core processor is a single computing component having two or more independent processors (referred to as cores). Each of the processors may read and execute program instructions.

The programs and/or the data stored in the ROM 120, the RAM 130, and/or the external memory 190 may be loaded to a memory in the CPU 110 when necessary. The ROM 120 may store permanent programs and/or data. The ROM 120 may be, for example, erasable programmable ROM (EPROM) or electrically erasable programmable ROM (EEPROM).

The RAM 130 may temporarily store programs, data, or instructions. The programs and/or data stored in the memory 120 or 190 may be temporarily stored in the RAM 130 under the control of the CPU 110, or a booting code stored in the ROM 120. The RAM 130 may be, for example, dynamic RAM (DRAM) or static RAM (SRAM).

The timer 135 may count an operating clock signal output from the CMU 165 and output a count value indicating a time based on the counting result.

The GPU 150 may convert data read by the memory controller 160 from the external memory 190 into a signal suitable for the display device 195. The CMU 165 generates the operating clock signal. The CMU 165 may include a clock signal generator such as, for example, a phase locked loop (PLL), a delay locked loop (DLL), or a crystal oscillator.

The operating clock signal may be applied to the GPU 150, as well as other elements of the SoC 100 (e.g., the CPU 110 or the memory controller 160). The CMU 165 may change the frequency of the operating clock signal under the control of the DVFS 115 (see FIG. 2).

The CPU 110 may execute a task stored in an execution queue. The CPU 110 detects the entry of the task to the execution queue and the exit of the task from the execution queue, and measures a residence time based on the detection.

The DVFS 115 may adjust the frequency of the operating clock signal applied to the CPU 110 when the residence time is equal to or greater than a reference time. The DVFS 115 may control the operation of the CMU 165 based on the residence time. As a result, the CMU 165 may change the frequency of the operating clock signal under the control of the DVFS 115.

The voltage controller 171 may control the voltage generator 175 based on a DVFS policy selected by the DVFS 115. Under the control of the voltage controller 171, the voltage generator 175 may generate an operating voltage for the CPU 110 based on the selected DVFS policy, and may output the operating voltage to the CPU 110.

The memory controller 160 interfaces with the external memory 190. The memory controller 160 controls the overall operation of the external memory 190, and controls data exchange between a host and the external memory 190.

For example, the memory controller 160 may write data to the external memory 190 or read data from the external memory 190 at the request of the host. The host may be a master device such as, for example, the CPU 110, the GPU 150 or the display controller 140.

The external memory 190 is a storage medium for storing data, and may store an operating system (OS) and various kinds of programs and/or data. The external memory 190 may be, for example, DRAM, however the external memory 190 is not limited thereto.

For example, the external memory 190 may be non-volatile memory such as, for example, flash memory, phase-change RAM (PRAM), magnetic RAM (MRAM), resistive RAM (ReRAM) or ferroelectric RAM (FeRAM). Although FIG. 1 illustrates the external memory 190 as being located outside of the SoC 100, exemplary embodiments are not limited thereto. For example, the external memory 190 may be an embedded memory provided within the SoC 100. The external memory 190 may also be an embedded multimedia card (eMMC) or a universal flash storage (UFS). The elements 110, 120, 130, 140, 150 and 160 may communicate with one another through the bus 180.

The display device 195 may display image signals output from the display controller 140. The display device 195 may be, for example, a liquid crystal display (LCD) device, a light emitting diode (LED) display device, an organic LED (OLED) display device, an active-matrix OLED (AMO-LED) display device, or a flexible display device. However, the display device 195 is not limited thereto. The display controller 140 controls the operation of the display device 195.

The DVFS 115 may be implemented in software (S/W) or firmware. The DVFS 115 may be implemented as a program and may be installed in the memory 120, 130 or 190, and executed by the CPU 110 when the SoC 100 is powered on. The DVFS 115 may control at least one element among the memories 120, 130, and 190, the timer 135, the CPU 110, the CMU 165, and the PMIC 170. An OS and/or middleware 200 may exist between the DVFS 115 and each of the elements 110, 120, 130, 135, 165, 170 and 190.

Figure 3:
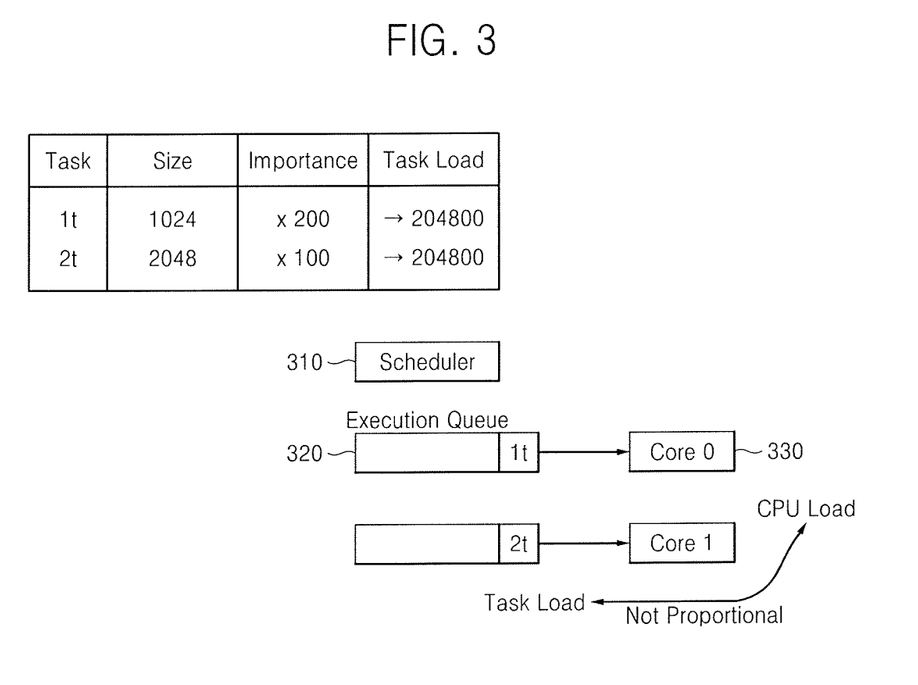
FIG. 3 is a diagram illustrating the difference between a task load and a central processing unit (CPU) load, according to an exemplary embodiment of the present inventive concept.

FIG. 3 is a diagram illustrating the difference between a task load and a CPU load, according to an exemplary embodiment of the present inventive concept. Tasks $1t$ and $2t$ have an intrinsic task load according to the size and the importance of a program. The task load is the amount of a task stored in an execution queue.

A scheduler 310 assigns a task to an execution queue 320 based on the task load. A CPU core 330 executes the task loaded in the execution queue 320. At this time, a CPU load occurs in the CPU core 330. The CPU load is the amount of a task stored in the CPU core 330.

Each task has a certain size and is assigned a value representing the importance level. The task load is the product of the size and the importance level of a program. For example, when the program has a size of 1024 and has an importance value of 200, the task load is 204,800 (e.g., 1024×200). When the program has a size of 2048 and has an importance value of 100, the task load is 204,800 (e.g., 2048×100). In FIG. 3, the two tasks $1t$ and $2t$ have the same task load.

Although the two tasks $1t$ and $2t$ have the same task load, they may have different CPU loads. The task load may not be in proportion to the CPU load because the CPU load is related to the size of the program, but is not related to the importance of the program.

Figure 4:
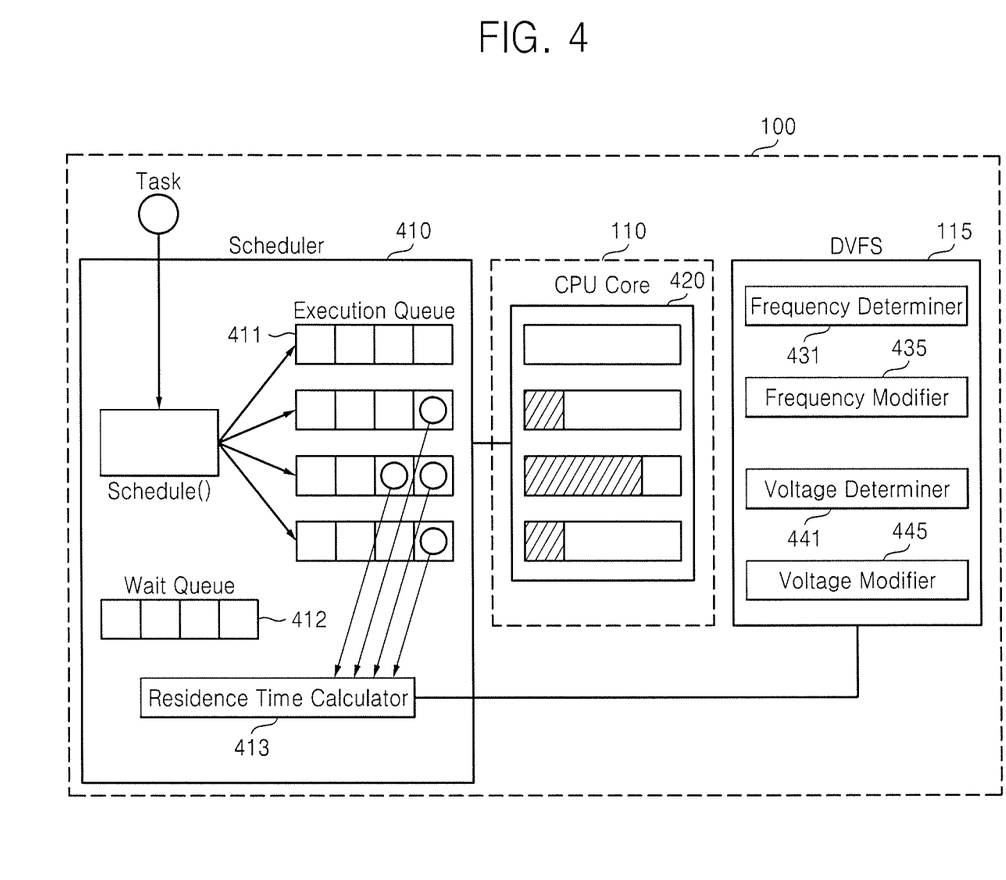
FIG. 4 is a block diagram of a system on chip (SoC), according to an exemplary embodiment of the present inventive concept.

FIG. 4 is a block diagram of the SoC 100, according to an exemplary embodiment of the present inventive concept. The SoC includes, for example, a scheduler 410, the CPU 110 including a CPU core 420, and the DVFS 115. In exemplary embodiments, the CPU 110 may include the scheduler 410 and/or the DVFS 115. The scheduler 410 includes an execution queue 411, a wait queue 412, and a residence time calculator 413. The DVFS 115 includes a frequency determiner 431, a frequency modifier 435, a voltage determiner 441, and a voltage modifier 445.

The scheduler 410, the execution queue 411, the wait queue 412, the residence time calculator 413, the CPU core 420, the DVFS 115, the frequency determiner 431, and the frequency modifier 435 may be, for example, hardware that can perform particular functions and operations in accordance with exemplary embodiments of the present inventive concept, a computer program code that can perform the particular functions and operations, or a non-transitory computer readable storage medium embodying instructions executed by a processor to perform the particular functions and operations.

For example, each of the elements 115, 410, 411, 412, 413, 420, 431, and 435 may be hardware for realizing the inventive concept, software for driving the hardware, or a functional and/or structural combination thereof.

When the scheduler 410 receives a task from the memory 120, 130, or 190, the scheduler 410 assigns the task to the execution queue 411 based on the program size and importance of the task. In FIG. 4, circles indicate the amount of a running task or waiting task assigned to the execution queue 411.

A task stored in the execution queue 411 is executed by the CPU core 420. In FIG. 4, a hatched region in the CPU core 420 indicates the amount of a CPU load generated by the task in the CPU core 420.

The scheduler 410 includes the residence time calculator 413. The residence time calculator 413 detects the entry of a task to the execution queue 411 and the exit of the task from the execution queue 411, and calculates a first residence time based on the detection results.

When the first residence time is equal to or greater than a reference time, the DVFS 115 adjusts the operating frequency of the CPU 110 (e.g., the frequency of an operating clock signal). The DVFS 115 includes the frequency determiner 431 that determines the operating frequency of the CPU 110 based on the first residence time, and the frequency modifier 435 that modifies the operating frequency of the CPU 110 according to the determined operating frequency.

The DVFS 115 also includes the voltage determiner 441 that determines the voltage of the CPU 110 based on the first residence time, and the voltage modifier 445 that modifies the voltage of the CPU 110 according to the determined voltage.

The residence time calculator 413 measures an entry time corresponding to when a task enters the execution queue 411 and an exit time corresponding to when the task exits the execution queue 411, and calculates a first residence time based on the difference between the entry time and the exit time.

The residence time calculator 413 calculates a unit residence time of each of at least one other task, and calculates a second residence time by adding the sum of unit residence times and the first residence time. A second residence time may be calculated for each core in the CPU core 420. For example, the first residence time may indicate an amount of time that at least one task resides in the execution queue 411, and a total unit residence time (e.g., all unit residence times added together) may indicate an amount of time that all tasks other than the at least one task reside in the execution queue. The second residence time may be calculated by adding the first residence time and the total unit residence time. The DVFS 115 adjusts the operating frequency of the CPU 110 when the second residence time is equal to or greater than a reference time.

The DVFS 115 sets a reference time and increases the operating frequency of the CPU 110 when a residence time is equal to or greater than the reference time, and decreases the operating frequency of the CPU 110 when the residence time is less than the reference time.

When a task is in an execution state in the execution queue 411, the residence time calculator 413 may calculate a first residence time corresponding to the execution state. When the task is in a wait state in the execution queue 411, the residence time calculator 413 may calculate a first residence time corresponding to the wait state.

The residence time calculator 413 may calculate a first residence time having a different property according to the state of a task, and may estimate a task load taking the execution or wait state into account according to the calculation result. Accordingly, the residence time calculator 413 provides the DVFS 115 with a residence time corresponding to a task load that varies with a task state. The DVFS 115 adjusts the operating frequency of the CPU 110 based on the residence time considering the task state.

The residence time calculator 413 sets a monitoring time in a register and calculates a first residence time during the monitoring time. The residence time calculator 413 calculates the first residence time during the monitoring time using the monitoring time that has already been set. The monitoring time may be set to a certain time corresponding to a residence time that regularly or irregularly changes over time.

The residence time calculator 413 calculates a plurality first residence times based on the monitoring time, and calculates the variation of the first residence times based on the calculation result. The residence time calculator 413 adjusts the monitoring time according to the variation of the first residence times. When the variation of the first residence times is greater than a reference value, the residence time calculator 413 decreases the monitoring time.

When the variation of the first residence times is less than the reference value, the residence time calculator 413 increases the monitoring time. For example, the residence time calculator 413 adjusts the monitoring time in inverse proportion to the variation of the first residence times.

The residence time calculator 413 generates an interrupt when the variation of the first residence times is equal to or greater than the reference value. The DVFS 115 may adjust the operating frequency of the CPU 110 in response to the interrupt.

When the variation of the first residence times is greater than the reference value, the residence time calculator 413 may generate an interrupt immediately without waiting for the monitoring time to elapse. As a result, the DVFS 115 increases the operating frequency of the CPU 110 within a short time, and the CPU 110 quickly executes a task at a high operating frequency.

Figure 5:
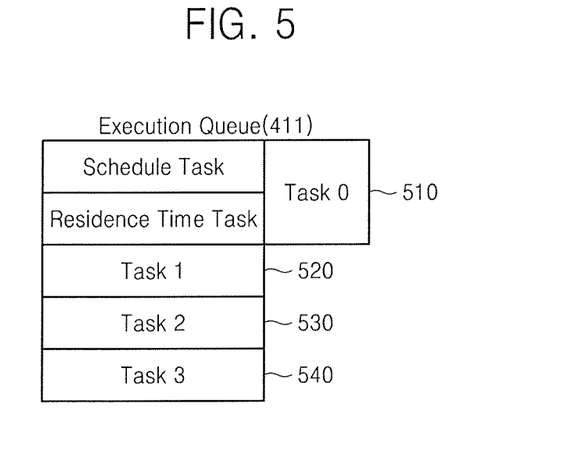
FIG. 5 is a block diagram illustrating the structure of tasks, according to an exemplary embodiment of the present inventive concept.

FIG. 5 is a block diagram illustrating the structure of tasks, according to an exemplary embodiment of the present inventive concept. A schedule task and a residence time task are assigned to task0 510 in the execution queue 411, a DVFS task is assigned to task1 520, and an application program task is assigned to task2 530 and task3 540. Task0 510 and task1 520 are kernel tasks always run by the CPU 110, and task2 530 and task3 540 are application programs executed or stopped by a user's operation.

Referring again to FIG. 4, the CPU 110 executes a task loaded in the execution queue 411 to operate the scheduler 410, the residence time calculator 413, the DVFS 115, and/or an application program. The CPU 110 executes a schedule task to operate the scheduler 410, executes a residence time task to operate the residence time calculator 413, executes a DVFS task to operate the DVFS 115, and executes task2 530 and task3 540 to operate an application program.

Figure 6:
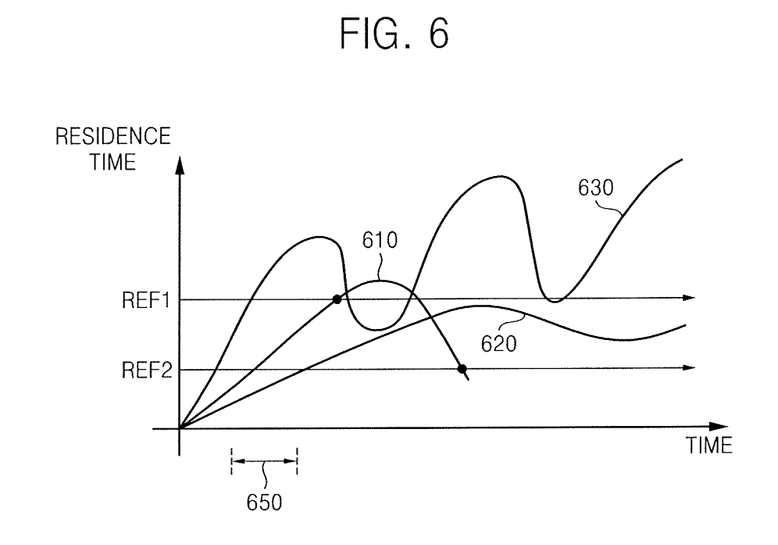
FIG. 6 is a diagram illustrating an operation of adjusting a monitoring time adaptively to the change in a task load, according to an exemplary embodiment of the present inventive concept.

FIG. 6 is a diagram illustrating an operation of adjusting a monitoring time adaptively to the change in a task load, according to an exemplary embodiment of the present inventive concept. Referring to FIGS. 4 and 6, the scheduler 410 measures an entry time corresponding to when a task enters the execution queue 411 and an exit time corresponding to when the task exits the execution queue 411, and calculates a residence time based on a difference between the entry time and the exit time.

The residence time may vary with a command code included in the task. For example, the residence time may be measured differently according to an execution time of the command code. A first residence time pattern 610 increases over a second reference value REF2 and decreases after passing a first reference value REF1. A second residence time pattern 620 changes within a range between the first reference value REF1 and the second reference value REF2. A third residence time pattern 630 increases with fluctuations.

The scheduler 410 may adjust a monitoring time 650 according to a residence time pattern. For example, when the residence time pattern has a large variation, the scheduler 410 decreases the monitoring time 650. That is, the scheduler 410 may control the monitoring time 650 so that the DVFS 115 can adjust the operating frequency of the CPU 110 quickly with respect to the variation of a residence time.

Figure 7:
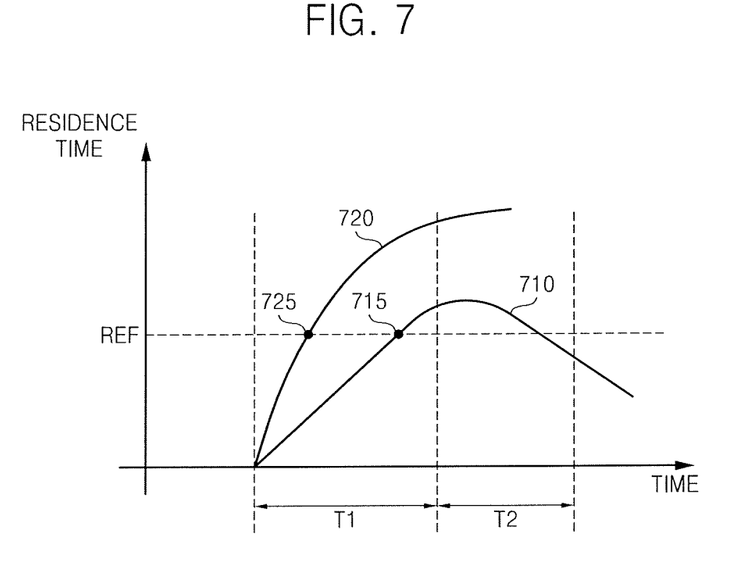
FIG. 7 is a diagram illustrating an operation of generating an interrupt adaptively to the change in a task load, according to an exemplary embodiment of the present inventive concept.

FIG. 7 is a diagram illustrating an operation of generating an interrupt adaptively to the change in a task load, according to an exemplary embodiment of the present inventive concept. A residence time has a different pattern depending on the change in a monitoring time. For example, in FIG. 7, a first residence time pattern 710 increases and then decreases, and a second residence time pattern 720 rapidly increases and then slows down. The scheduler 410 measures a residence time during a monitoring time T1.

When the DVFS 115 adjusts the operating frequency of the CPU 110 based on the measured residence time, the following case may occur. The DVFS 115 adjusts the operating frequency of the CPU 110 in a period T2 where the residence time changes slowly, and therefore, the task execution of the CPU 110 is not affected.

During the monitoring time T1, the scheduler 410 may generate an interrupt at points 715 and 725 where the residence time passes over a reference value REF. As a result, the DVFS 115 adjusts the operating frequency of the CPU 110 to quickly react to the task load.

For example, during the monitoring time T1 of the first residence time pattern 710, the scheduler 410 generates an interrupt at the point 715 and the DVFS 115 increases the operating frequency of the CPU 110 in response to the interrupt. During the monitoring time T1 of the second residence time pattern 720, the scheduler 410 generates an interrupt at the point 725 and the DVFS 115 increases the operating frequency of the CPU 110 in response to the interrupt. Accordingly, the CPU 110 is controlled to quickly react to the increase of the task load.

Figure 8:
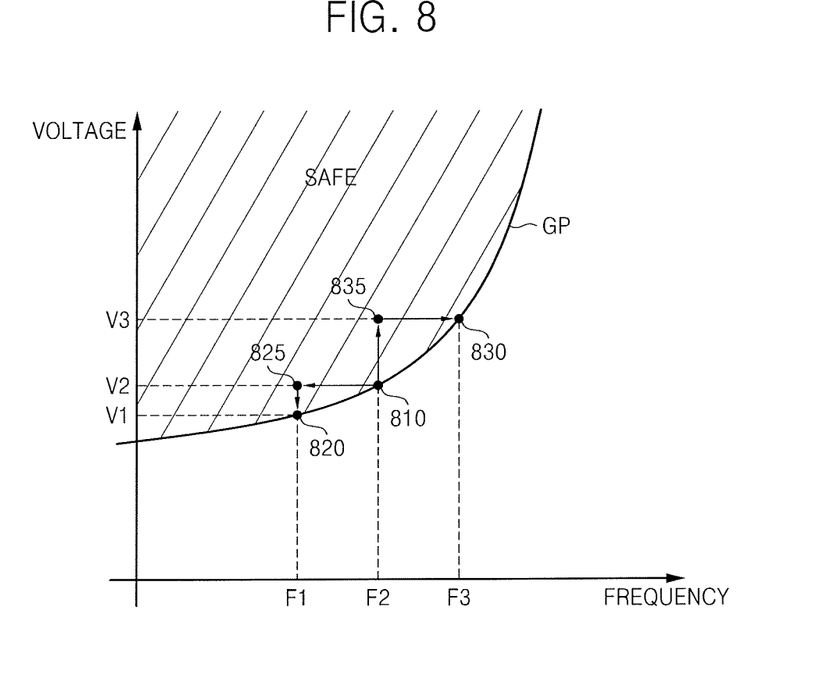
FIG. 8 is a diagram showing an example of modifying the voltage and frequency of a CPU, according to an exemplary embodiment of the present inventive concept.

FIG. 8 is a diagram showing an example of modifying the voltage and frequency of the CPU, according to an exemplary embodiment of the present inventive concept. A region above a graph GP modifying voltage and frequency is referred to as a safe region. A procedure in which the DVFS 115 modifies the voltage and frequency in the safe region will be described below. Exemplary voltages and frequencies are used below with reference to FIG. 8. Exemplary embodiments are not limited to these exemplary voltages and frequencies.

The DVFS 115 controls the CMU 165 managing the frequency of an operating clock signal, and the PMIC 170 managing power to adjust the operating voltage and frequency of the CPU 110. In order to increase the operating frequency of the CPU 110 from a second operating frequency F2 to a third operating frequency F3, the DVFS 115 increases the operating voltage from a second voltage V2 to a third voltage V3, and then increases the operating frequency from the second operating frequency F2 to the third operating frequency F3. For example, in order to increase the operating frequency of the CPU 110 from 1 GHz 810 to 1.2 GHz 830, the DVFS 115 increases the operating voltage from 1.0 V 810 to 1.2 V 835, and then increases the operating frequency from 1 GHz 835 to 1.2 GHz 830.

In order to decrease the operating frequency of the CPU 110 from the second operating frequency F2 to a first operating frequency F1, the DVFS 115 decreases the operating frequency from the second operating frequency F2 to the first operating frequency F1, and then decreases the operating voltage from the second voltage V2 to a first voltage V1. For example, in order to decrease the operating frequency of the CPU 110 from 1 GHz 810 to 900 MHz 820, the DVFS 115 decreases the operating frequency from 1 GHz 810 to 900 MHz 820, and then decreases the operating voltage from 1.0 V 825 to 0.9 V 820.

Figure 9:
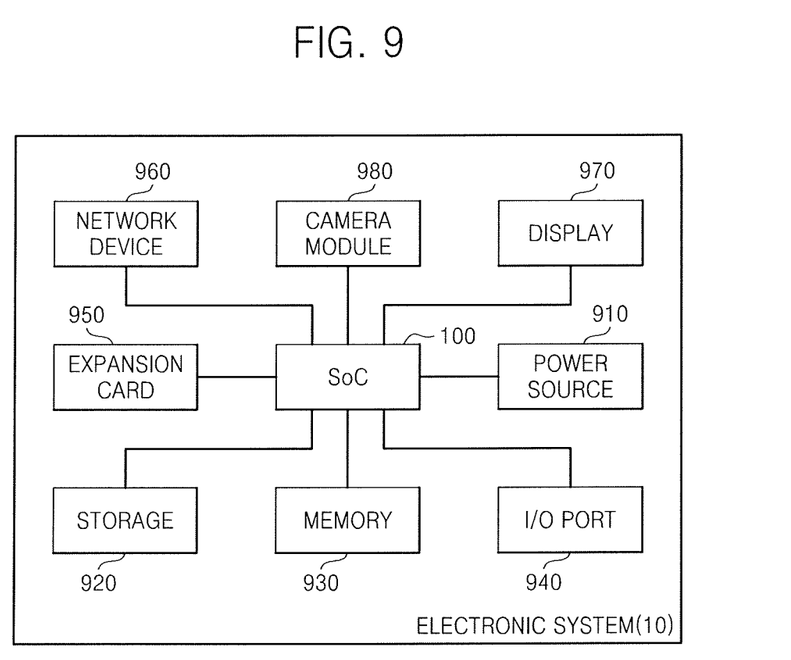
FIG. 9 is a block diagram of an electronic system including a system on chip (SOC), according to an exemplary embodiment of the present inventive concept.

FIG. 9 is a block diagram of the electronic system 10 including the SoC 100, according to an exemplary embodiment of the present inventive concept. The electronic system 10 may be, for example, a notebook computer, a PC, a data server, a processor for a server, or a portable electronic device. The portable electronic device may be, for example, a laptop computer, a mobile telephone, a smart phone, a tablet PC, a PDA, an EDA, a digital still camera, a digital video camera, a PMP, a PND, a handheld game console, MID, or an e-book.

The electronic system 10 may include the SoC 100, a power source 910, a storage 920, a memory 930, an I/O port 940, an expansion card 950, a network device 960, a display 970, and a camera module 980, however the components included in the electronic system 10 are not limited thereto.

The SoC 100 may correspond to the SoC 100 illustrated in FIG. 1. The SoC 100 may utilize a multi-core processor, and may control the operation of at least one of the elements 910 through 980.

The power source 910 may supply an operating voltage to at least one of the elements 100 and 920 through 980. The storage 920 may be, for example, a hard disk drive (HDD) or a solid state drive (SSD), however the storage 920 is not limited thereto.

The memory 930 may be, for example, a volatile or non-volatile memory. The memory 930 may correspond to the external memory 190 illustrated in FIG. 1. A memory controller that controls a data access operation (e.g., a read operation, a write operation (or a program operation), or an erase operation) on the memory 930 may be integrated into or embedded in the SoC 100. Alternatively, the memory controller may be provided between the SoC 100 and the memory 930.

The I/O port 940 receives data transmitted to the electronic system 10 or transmits data from the electronic system 10 to an external device. For example, the I/O port 940 may be a port for connection with a pointing device such as a computer mouse, a port for connection with a printer, or a port for connection with a universal serial bus (USB) drive.

The expansion card 950 may be, for example, a secure digital (SD) card, a multimedia card (MMC), a subscriber identity module (SIM) card, or a universal SIM (USIM) card.

The network device 960 enables the electronic system 10 to be connected with a wired or wireless network. The display 970 displays data output from the storage 920, the memory 930, the I/O port 940, the expansion card 950, or the network device 960.

The camera module 980 is a module that can convert an optical image into an electrical image. Accordingly, the electrical image output from the camera module 980 may be stored in the storage 920, the memory 930, or the expansion card 950. In addition, the electrical image output from the camera module 980 may be displayed through the display 970.

Figure 10:
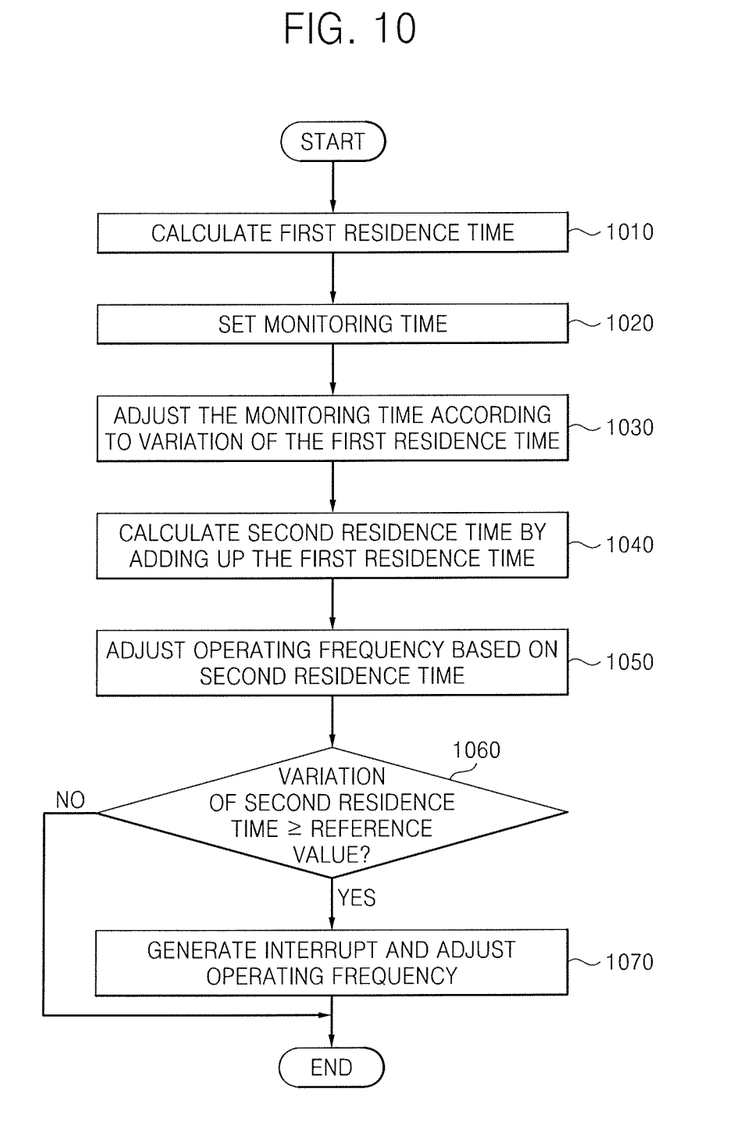
FIG. 10 is a flowchart of a DVFS method, according to an exemplary embodiment of the present inventive concept.

FIG. 10 is a flowchart of a DVFS method, according to an exemplary embodiment of the present inventive concept. At operation 1010, the SoC 100 calculates a first residence time indicating a time that each of at least one task resides in the execution queue 411. For example, the SoC 100 measures an entry time at which the task enters the execution queue 411 and an exit time at which the task exits the execution queue 411, and calculates the first residence time based on a difference between the entry time and the exit time. The SoC 100 calculates the first residence time corresponding to an execution state when the task is in the execution state in the execution queue 411, and calculates the first residence time corresponding to a wait state when the task is in the wait state in the execution queue 411.

At operation 1020, the SoC 100 sets the monitoring time 650 in a register, and calculates the first residence time during the monitoring time 650. At operation 1030, the SoC 100 adjusts the monitoring time 650 according to the variation of the first residence time, which is calculated based on the monitoring time 650. The SoC 100 decreases the monitoring time 650 when the variation is large, and increases the monitoring time 650 when the variation is small.

The SoC 100 adds up the first residence time of at least one task assigned to each of at least one core, and calculates a second residence time for each core in operation 1040. For example, the SoC 100 calculates a unit residence time for each of at least one other task, and calculates the second residence time by adding the sum of calculated unit residence times and the first residence time. The first residence time may indicate an amount of time that at least one task resides in the execution queue 411, and a total unit residence time (e.g., all unit residence times added together) may indicate an amount of time that all tasks other than the at least one task reside in the execution queue. The second residence time may be calculated by adding the first residence time and the total unit residence time.

At operation 1050, the SoC 100 adjusts the operating frequency and/or the voltage for the at least one core based on the second residence time. The SoC 100 adjusts the operating frequency for the at least one core when the second residence time is equal to or greater than a reference time.

When a variation of the second residence time is equal to or greater than a reference value at operation 1060, the SoC 100 generates an interrupt and adjusts the operating frequency for the at least one core at operation 1070. When the variation of the second residence time is greater than the reference value, the SoC 100 generates the interrupt without waiting for the monitoring time 650 to elapse, so as to increase the operating frequency within a short time, thereby quickly executing the task at a high operating frequency.

As described above, according to an exemplary embodiment of the present inventive concept, an SoC determines the operating frequency of a CPU based on the amount of a task currently being executed and the amount of a task to be executed, thereby quickly reacting to the increase and decrease in the amount of tasks. As a result, the tasks can be quickly executed with a high responsiveness.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A method of operating a system on chip (SoC), comprising:
  calculating, by a multi-core processor in the SoC, a first residence time indicating an amount of time that at least one task resides in an execution queue in the SoC, wherein the at least one task is assigned to at least one core of the multi-core processor;
  calculating, by the multi-core processor, a total unit residence time indicating an amount of time that all tasks other than the at least one task reside in all execution queues in the SoC other than the execution queue;
  calculating, by the multi-core processor, a second residence time for the at least one core by adding the first residence time of the at least one task and the total unit residence time; and
  adjusting, by the multi-core processor, at least one of an operating frequency and a voltage of the at least one core based on the second residence time.

2. The method of claim 1, wherein calculating the first residence time comprises:
  measuring an entry time indicating when the at least one task enters the execution queue and an exit time indicating when the at least one task exits the execution queue; and
  calculating the first residence time based on a difference between the entry time and the exit time.

3. The method of claim 1, wherein calculating the first residence time comprises calculating the first residence time corresponding to an execution state when the at least one task is in the execution state in the execution queue.

4. The method of claim 1, wherein calculating the first residence time comprises calculating the first residence time corresponding to a wait state when the at least one task is in the wait state in the execution queue.

5. The method of claim 1, further comprising:
  setting a monitoring time in a register,
  wherein calculating the first residence time comprises calculating the first residence time during the monitoring time.

6. The method of claim 5, wherein setting the monitoring time comprises adjusting the monitoring time according to a variation of the first residence time during the monitoring time.

7. The method of claim 1, wherein adjusting the operating frequency comprises:
  generating an interrupt when a variation of the second residence time is equal to or greater than a reference value; and
  adjusting the operating frequency at a time that the interrupt is generated.

8. The method of claim 1, wherein the at least one task is assigned to the at least one core based on a task load of the at least one task, and the task load is based on a size and an importance level of the at least one task.

9. A system on chip (SoC), comprising:
  a processor comprising at least one core configured to execute at least one task; and
  a memory configured to provide the processor with the at least one task,
  wherein the processor is configured to:
  calculate a first residence time indicating an amount of time that the at least one task resides in at least one execution queue in the SoC, wherein the at least one task is assigned to the at least one core,
  calculate a total unit residence time indicating an amount of time that all tasks other than the at least one task reside in all execution queues in the SoC other than the at least one execution queue,
  calculate a second residence time for the at least one core by adding the first residence time of the at least one task and the total unit residence time, and adjust at least one of an operating frequency and an operating voltage of the processor based on the second residence time.

10. The SoC of claim 9, wherein the processor comprises a plurality of central processing unit (CPU) cores, and the processor is configured to calculate the first residence time for each of the CPU cores.

11. The SoC of claim 9, wherein the processor further comprises a register configured to set a monitoring time, and the processor is configured to:
calculate the first residence time during the monitoring time,
calculate a variation of the first residence time based on the monitoring time, and
adjust the monitoring time according to the variation of the first residence time.

12. The SoC of claim 9, wherein the processor is configured to generate an interrupt when a variation of the second residence time is equal to or greater than a reference value, and adjust the operating frequency of the processor in response to the interrupt.

13. A mobile communication device, comprising:
the SoC of claim 9; and
an external memory configured to provide the SoC with the at least one task.

14. The mobile communication device of claim 13, wherein the SoC further comprises a timer, and the processor is configured to measure an entry time indicating when the at least one task enters the execution queue and an exit time indicating when the at least one task exits the execution queue using the timer, and calculate the first residence time based on a difference between the entry time and the exit time.

15. The mobile communication device of claim 13, wherein the mobile communication device is one of a mobile telephone, a smart phone, a tablet personal computer (PC), a personal digital assistant (PDA), an enterprise digital assistant (EDA), a digital still camera, a digital video camera, a portable multimedia player (PMP), portable navigation device (PND), a handheld game console, and an e-book.

16. A non-transitory computer readable storage medium embodying instructions executed by a processor to perform a method of operating a system on chip (SoC), comprising:
calculating a first residence time indicating an amount of time that at least one task resides in an execution queue in the SoC, wherein the at least one task is assigned to at least one core of a multi-core processor in the SoC;
calculating a total unit residence time indicating an amount of time that all tasks other than the at least one task reside in all execution queues in the SoC other than the execution queue;
calculating a second residence time for the at least one core by adding the first residence time of the at least one task and the total unit residence time; and
adjusting at least one of an operating frequency and a voltage of the at least one core based on the second residence time.

17. The non-transitory computer readable storage medium of claim 16, wherein the at least one task is assigned to the at least one core based on a task load of the at least one task, and the task load is based on a size and importance of the at least one task.

18. The non-transitory computer readable storage medium of claim 16, wherein calculating the first residence time comprises:
measuring an entry time indicating when the at least one task enters the execution queue and an exit time indicating when the at least one task exits the execution queue; and
calculating the first residence time based on a difference between the entry time and the exit time.

19. The non-transitory computer readable storage medium of claim 16, wherein calculating the first residence time comprises calculating the first residence time corresponding to an execution state when the at least one task is in the execution state in the execution queue.

20. The non-transitory computer readable storage medium of claim 16, wherein calculating the first residence time comprises calculating the first residence time corresponding to a wait state when the at least one task is in the wait state in the execution queue.

* * * * *